United States Patent
Zhu

(10) Patent No.: US 9,840,198 B2
(45) Date of Patent: Dec. 12, 2017

(54) AROUND VIEW MONITOR SYSTEM AND METHOD OF CONTROLLING THE SAME

(71) Applicant: HYUNDAI MOBIS Co., Ltd., Yongin-si, Gyeonggi-do (KR)

(72) Inventor: Hui Ling Zhu, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/922,772

(22) Filed: Oct. 26, 2015

(65) Prior Publication Data
US 2016/0129837 A1  May 12, 2016

(30) Foreign Application Priority Data
Nov. 12, 2014  (KR) ........................ 10-2014-0157257

(51) Int. Cl.
B60R 1/00  (2006.01)
(52) U.S. Cl.
CPC .......... B60R 1/00 (2013.01); *B60R 2300/306* (2013.01); *B60R 2300/602* (2013.01); *B60R 2300/607* (2013.01); *B60R 2300/70* (2013.01); *G06T 2200/24* (2013.01)
(58) Field of Classification Search
None
See application file for complete search history.

(56) References Cited

U.S. PATENT DOCUMENTS

| | | | | |
|---|---|---|---|---|
| 2012/0078440 A1* | 3/2012 | Oravis | ...................... | B60R 1/00 701/1 |
| 2012/0154591 A1* | 6/2012 | Baur | ........................ | B60R 1/00 348/148 |
| 2013/0016122 A1* | 1/2013 | Bhatt | .................. | G06F 3/04845 345/620 |
| 2013/0204457 A1* | 8/2013 | King | ...................... | B60K 28/06 701/1 |
| 2014/0136054 A1* | 5/2014 | Hsia | ........................ | B60R 1/00 701/42 |
| 2014/0347489 A1* | 11/2014 | Kumon | ..................... | B60R 1/00 348/148 |

* cited by examiner

*Primary Examiner* — Alexander Eisen
*Assistant Examiner* — Kebede Teshome
(74) *Attorney, Agent, or Firm* — Paratus Law Group, PLLC

(57) ABSTRACT

Disclosed are an around view monitor system and a method of controlling the same. The around view monitor system includes: a travel information receiving unit configured to receive gear information from a transmission of a vehicle; a touch input receiving unit configured to receive a touch signal for a display device provided in the vehicle; and a control unit configured to control an output effect to be applied to image data around the vehicle output to the display device according to the gear information transmitted from the travel information receiving unit and the touch signal transmitted from the touch input receiving unit.

7 Claims, 6 Drawing Sheets

AROUND VIEW MONITOR SYSTEM AND METHOD OF CONTROLLING THE SAME

CROSS-REFERENCE TO RELATED APPLICATIONS

The present application claims priority to Korean Patent Application Number 10-2014-0157257 filed Nov. 12, 2014, the entire contents of which the application is incorporated herein for all purposes by this reference.

TECHNICAL FIELD

The present invention relates to an around view monitor system and a method of controlling the same, and more particularly, to an around view monitor system, which enables a driver to view surrounding images of a travelling vehicle through a monitor to enable the driver to drive the vehicle while recognizing information of a surrounding situation, thereby providing the driver with driving convenience and safety, and a method of controlling the same.

BACKGROUND

An around view monitor (AVM) system is a system for displaying a surrounding image of a vehicle photographed by a camera attached to the vehicle on a monitor inside the vehicle to enable a driver to drive while recognizing a surrounding situation of the vehicle through the image on the monitor.

In the meantime, in an AVM system in the related art, a view mode is changed by a method of clicking a view mode icon by a user. The change method has a problem in that if a user does not have sufficient prior knowledge for a view mode, it is difficult for the user to recognize which part of the vehicle corresponds to a displayed image, and it is difficult to recognize correlation between views before and after the change. Further, the view mode is limited, so that it is difficult to monitor a surrounding situation of the vehicle in various angles.

SUMMARY

The present invention has been made in an effort to provide an around view monitor system and a method of controlling the same.

The present invention has also been made in an effort to display a customized image based on a touch input of a user, and intuitively display a correlation between views by applying various animation effects when a view is changed, thereby providing convenience for a user.

Objects of the present invention are not limited to the objects described above, and other objects that are not described will be clearly understood by a person skilled in the art from the description below.

An exemplary embodiment of the present invention provides an around view monitor system, including: a travel information receiving unit configured to receive gear information from a transmission of a vehicle; a touch input receiving unit configured to receive a touch signal for a display device provided in the vehicle; and a control unit configured to control an output effect to be applied to image data around the vehicle output to the display device according to the gear information transmitted by the travel information receiving unit and the touch signal transmitted from the touch input receiving unit.

The control unit may include: a view change effect selection unit configured to select an output effect corresponding to the touch signal among a plurality of output effects; and a view change unit configured to apply the output effect selected by the view change effect selection unit to the image data.

The touch signal may include: a first touch signal of touching the display device one time; a second touch signal of continuously touching the display device two times; a third touch signal of zooming in or zooming out a screen of the display device; and a fourth touch signal of touching the display device to push and move an image in up, down, left, and right directions.

The control unit may control the display device so as to display a screen including an around view area outputting the image data according to the touch signal, a crop-view area outputting an enlarged part of the image data output on the area view area according to the touch signal, and a button area, in which an icon selecting an output angle of the image data is generated.

The around view area may output the image data according to the first touch signal or the second touch signal.

The crop-view area may output the image data according to the third touch signal or the fourth touch signal.

Another exemplary embodiment of the present invention provides a method of controlling an around view monitor system, including: receiving gear information from a transmission of a vehicle; receiving a touch signal for a display device provided in the vehicle; selecting an output effect to be applied to image data around the vehicle output to the display device according to the gear information and the touch signal; and applying the selected output effect to the image data and outputting the image data to the display device.

The selecting of the output effect of the image data may include selecting an output effect corresponding to the touch signal among a plurality of output effects based on the number of times of a touch or a touch method.

The touch signal may include: a first touch signal of touching the display device one time; a second touch signal of continuously touching the display device two times; a third touch signal of zooming in or zooming out a screen of the display device; and a fourth touch signal of touching the display device to push and move an image in up, down, left, and right directions.

The screen of the display device may include: an around view area outputting the image data according to the touch signal; a crop-view area outputting an enlarged part of the image data output on the around view area according to the touch signal; and a button area, in which an icon selecting an output angle of the image data is generated.

Other detailed matters of the exemplary embodiments are included in the detailed description and the drawings.

According to the around view monitor system and the method of controlling the same of the present invention, there are one or more effects as follows.

It is possible to display a customized image based on a touch input of a user, and intuitively display a correlation between views by applying various animation effects when a view is changed, thereby improving convenience for a user.

The effects of the present invention are not limited to the aforementioned effects, and other effects, which are not mentioned above, will be clearly understood by those skilled in the art from the claims.

DETAILED DESCRIPTION

Figure 1:
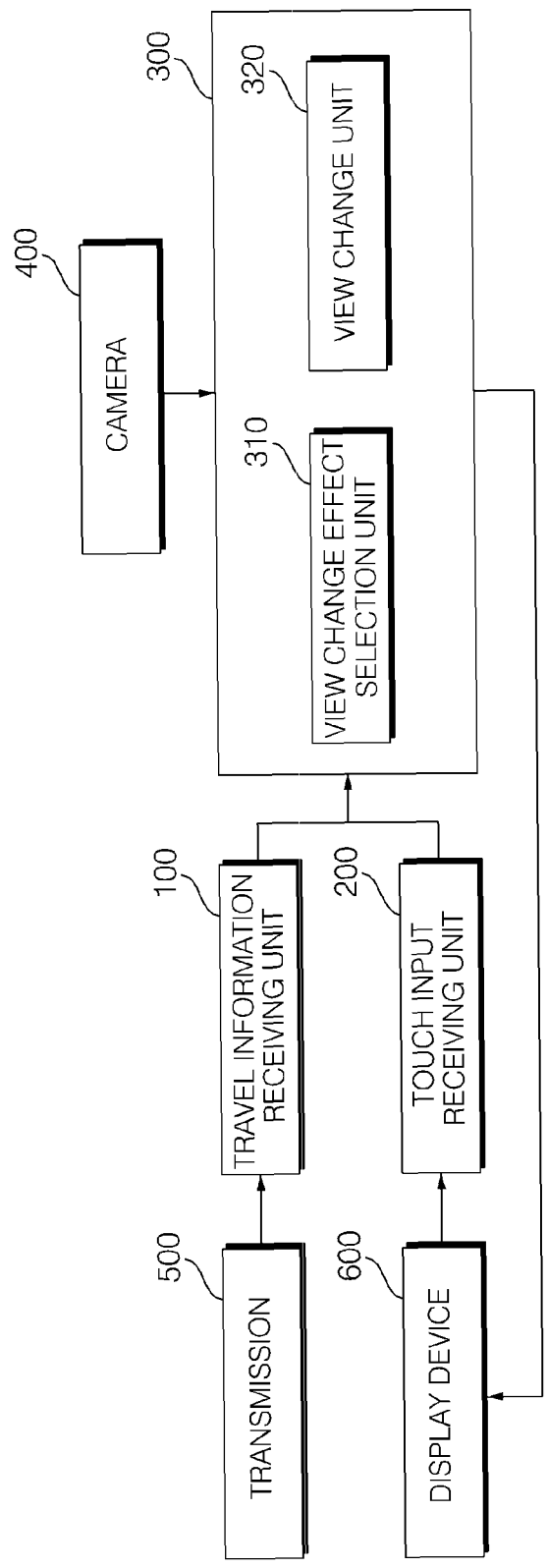
FIG. 1 is a diagram illustrating an around view monitor (AVM) system according to the present invention.

Various advantages and features of the present invention and methods accomplishing thereof will become apparent from the following detailed description of exemplary embodiments with reference to the accompanying drawings. However, the present invention is not limited to the exemplary embodiments set forth below, and may be embodied in various other forms. The exemplary embodiments introduced herein are provided to make disclosed contents thorough and complete and sufficiently transfer the scope of the present invention to those skilled in the art, and the present invention will only be defined by the scope of the claims. Like reference numerals indicate like elements throughout the specification.

Hereinafter, the present invention will be described with reference to the drawings explaining an around view monitor (AVM) system and a method of controlling the same according to exemplary embodiments of the present invention.

A preferable AVM system and a method of controlling the same may be modified by those skilled in the art, and in a present exemplary embodiment, an AVM system and a method of controlling the same will be described.

Figure 2:
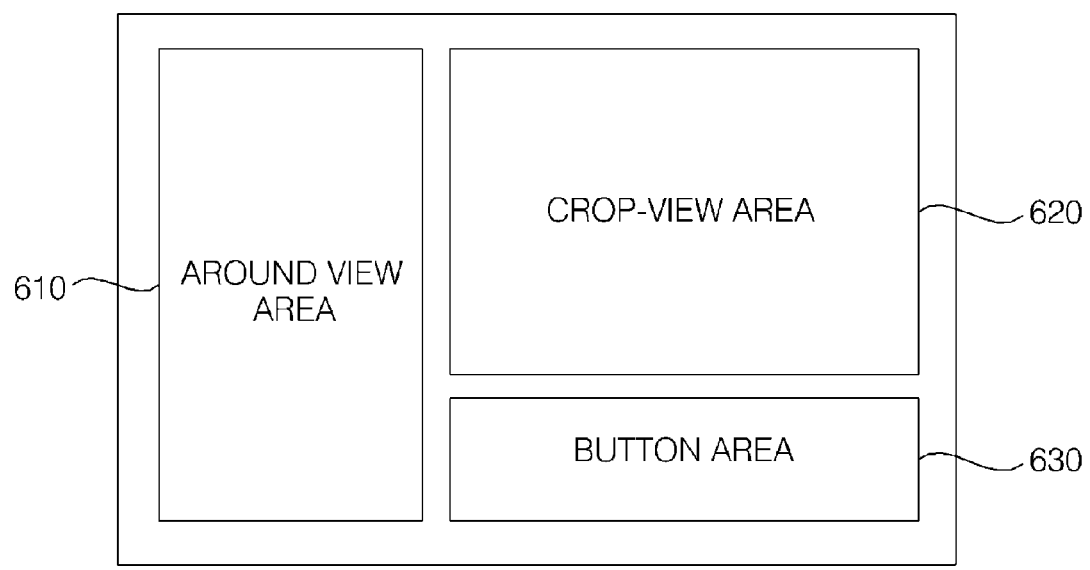
FIG. 2 is a diagram illustrating a configuration of a screen of the AVM system according to the present invention.

FIG. 1 is a diagram illustrating an AVM system according to the present invention, and FIG. 2 is a diagram illustrating a configuration of a screen of the AVM system according to the present invention.

Referring to FIGS. 1 and 2, an AVM system and a method of controlling the same according to an exemplary embodiment of the present invention includes a travel information receiving unit 100 receiving gear information from a transmission 500 of a vehicle, a touch input receiving unit 200 receiving a touch signal of a display device 600 provided in the vehicle, and a control unit 300 controlling an output effect of image data around the vehicle output to the display device 600 according to the gear information transmitted from the travel information receiving unit 100 and the touch signal transmitted from the touch input receiving unit 200.

The travel information receiving unit 100 may receive gear information from the transmission 500 of the vehicle. More particularly, the travel information receiving unit 100 may determine a travel direction of the vehicle by using the gear information of the transmission 500 of the vehicle and steering information of a steering wheel (not illustrated), and display received image data according to the travel direction on the display device 600. The travel information receiving unit 100 may check whether the vehicle drives or reverses, and when the gear information indicates that the vehicle drives, the travel information receiving unit 100 displays an image obtained from a front camera 400 of the vehicle, and when the gear information indicates that the vehicle reverses, the travel information receiving unit 100 displays an image obtained from a rear camera 400 of the vehicle.

The touch input receiving unit 200 may receive a touch signal of the display device 600 included in the vehicle. That is, the touch input receiving unit 200 may differently receive a touch signal according to the number of times of touch of the display device 600 by a user, a touch method, and a touch area. According to the present exemplary embodiment, the touch signal may include four types of touch signals, that is, a first touch signal, a second touch signal, a third touch signal, and a fourth touch signal. This will be described in detail below.

The control unit 300 may control an output effect of image data around the vehicle output to the display device 600 according to the gear information transmitted from the travel information receiving unit 100 and the touch signal transmitted from the touch input receiving unit 200.

The control unit 300 may include a view change effect selection unit 310 selecting an output effect of the image data, and a view change unit 320 applying an output effect to image data.

Here, the view change effect selection unit 310 may receive a touch signal transmitted from the touch input receiving unit 200 and analyze the touch signal, and select an output effect of image data corresponding to the touch signal.

The view change effect selection unit 310 may analyze which touch signal among the plurality of pre-set touch signals is received based on the number of times of touch or a touch method. Further, the view change effect selection unit 310 may select an output effect corresponding to the analyzed touch signal among a plurality of output effects.

The view change effect selection unit 310 may analyze a plurality of different touch signals. More particularly, the view change effect selection unit 310 may select one among a first touch signal of touching the display device 600 one time, a second touch signal of continuously touching the display device 600 two times, a third touch signal of zooming in or zooming out a screen of the display device 600, and a fourth touch signal of touching the display device 600 to push and move an image in up, down, left, and right directions. Further, the view change effect selection unit 310 may select an output effect corresponding to the selected touch signal. To this end, information on the plurality of output effects corresponding to the first to fourth touch signals, respectively, may be pre-stored in the control unit 300.

The view change unit 320 may receive the output effect selected by the view change effect selection unit 310 and apply the output effect to the image data.

The display device 600 may be provided inside the vehicle to output the image data transmitted from the view change unit 320. Further, the display device 600 may output various contents, such as navigation data, DMB data, and image data.

A screen of the display device 600 may be divided into a plurality of areas according to the kind of output image data. According to the present exemplary embodiment, the screen of the display device 600 may include an around view area 610, a crop-view area 620, and a button area 630. The control unit 600 may control the display device 600 so as to display at least one of the around view area 610, the crop-view area 620, or the button area 630 on the screen.

Figure 3:
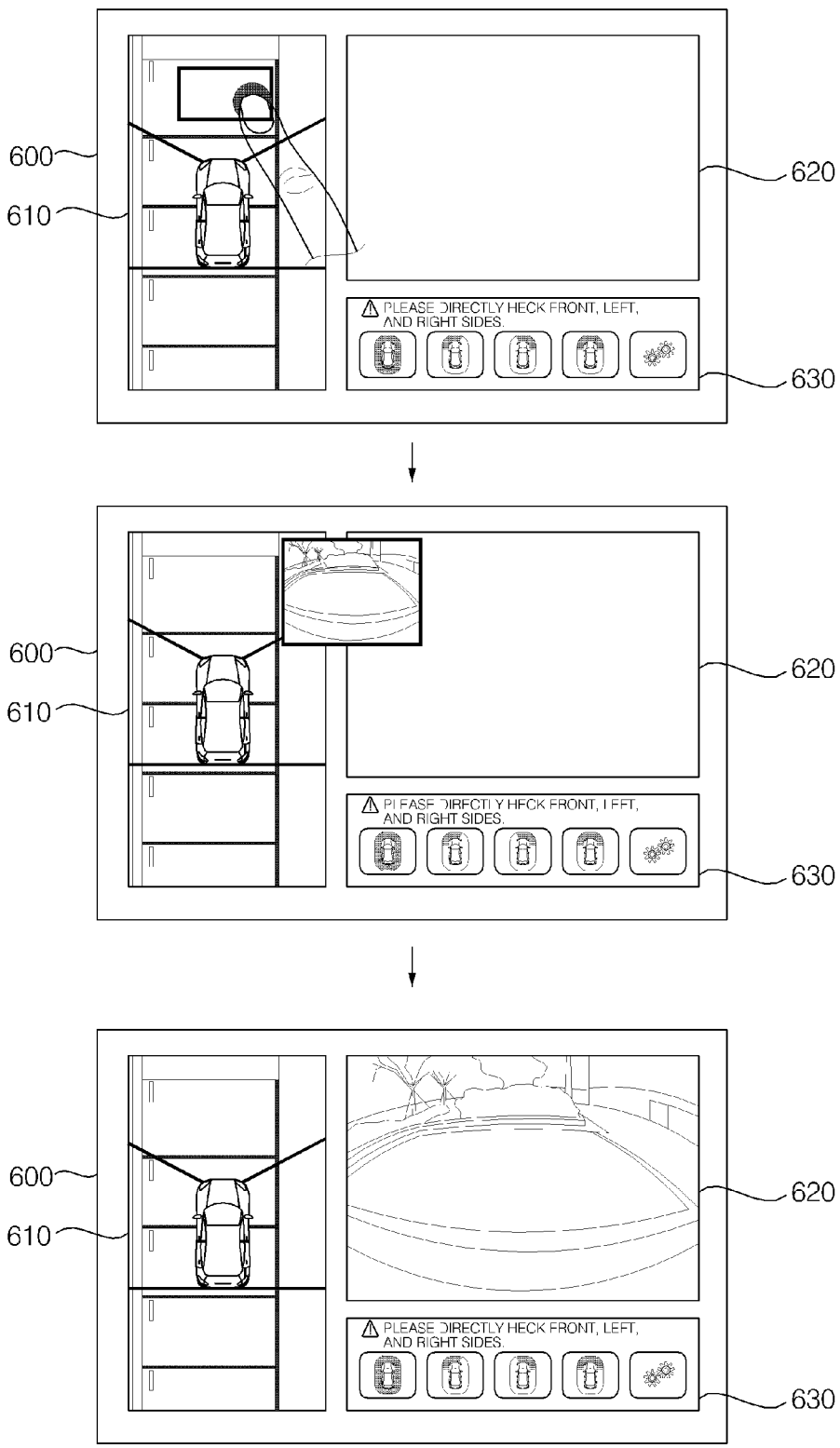
FIG. 3 is a diagram illustrating an operation state according to a first touch signal in the AVM system according to the present invention.

FIG. 3 is a diagram illustrating an operation state according to the first touch signal in the AVM system according to the present invention.

Referring to FIG. 3, a top view may be displayed on the around view area 610, and an outputting screen may be controlled according to the first touch signal. More particularly, when a user touches a part of the around view area 610 one time, the touched around view area 610 is enlarged, so that the image data may be output through the crop-view area 620 which is to be described below.

Figure 4:
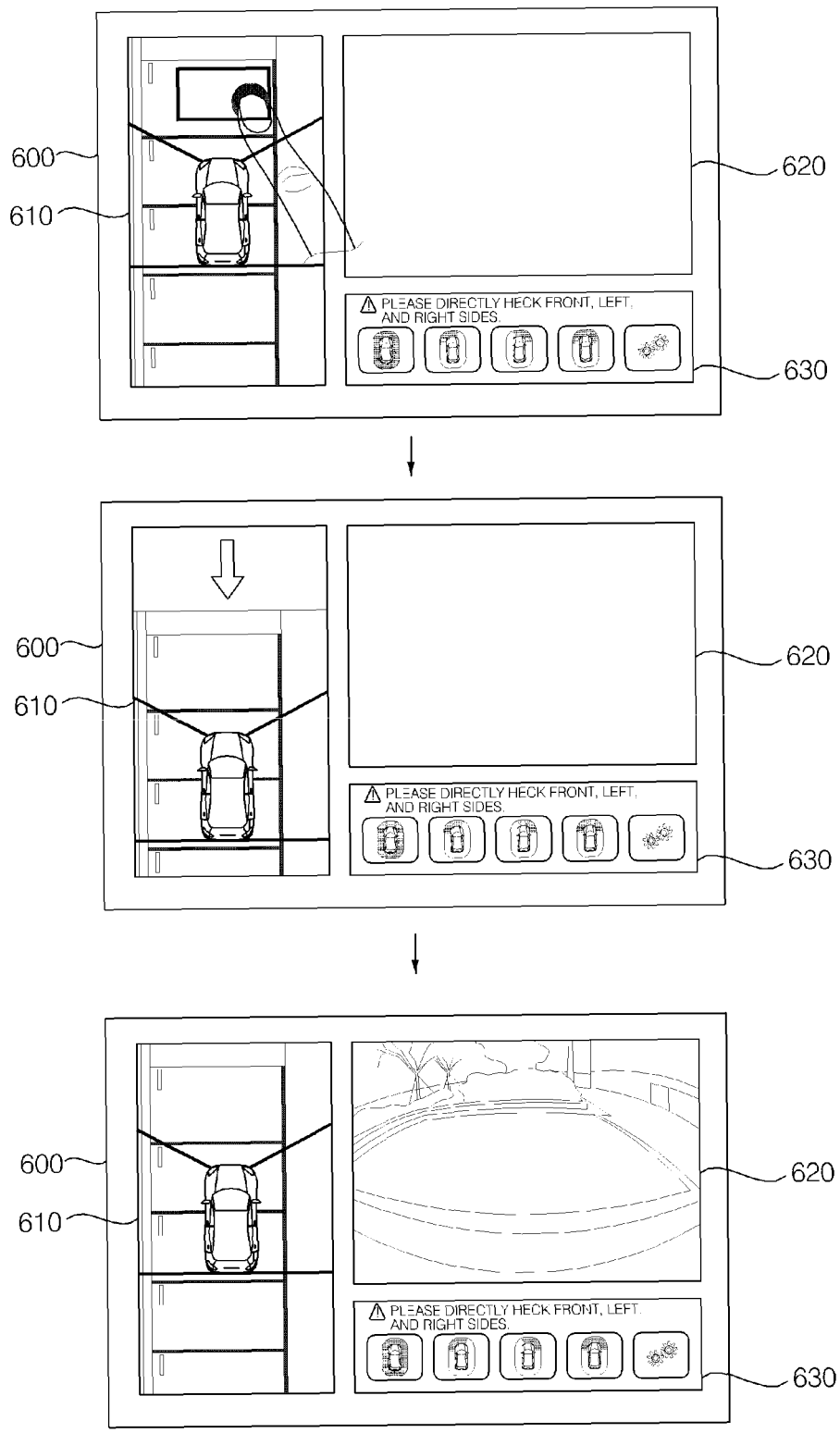
FIG. 4 is a diagram illustrating an operation state according to a second touch signal in the AVM system according to the present invention.

FIG. 4 is a diagram illustrating an operation state according to the second touch signal in the AVM system according to the present invention.

Referring to FIG. 4, a top view may be displayed on the around view area 610, and an outputting screen may be controlled according to the second touch signal. More particularly, when a user continuously touches a part of the around view area 610 two times, an image output on the touched around view area 610 may move in an up/down direction. Here, when the around view area 610 is divided by half, and a user continuously touches an area corresponding to an upper half, the image may move in a down direction, and when the around view area 610 is divided by half, and a user continuously touches an area corresponding to a lower half two times, the image may move in a up direction.

Figure 5:
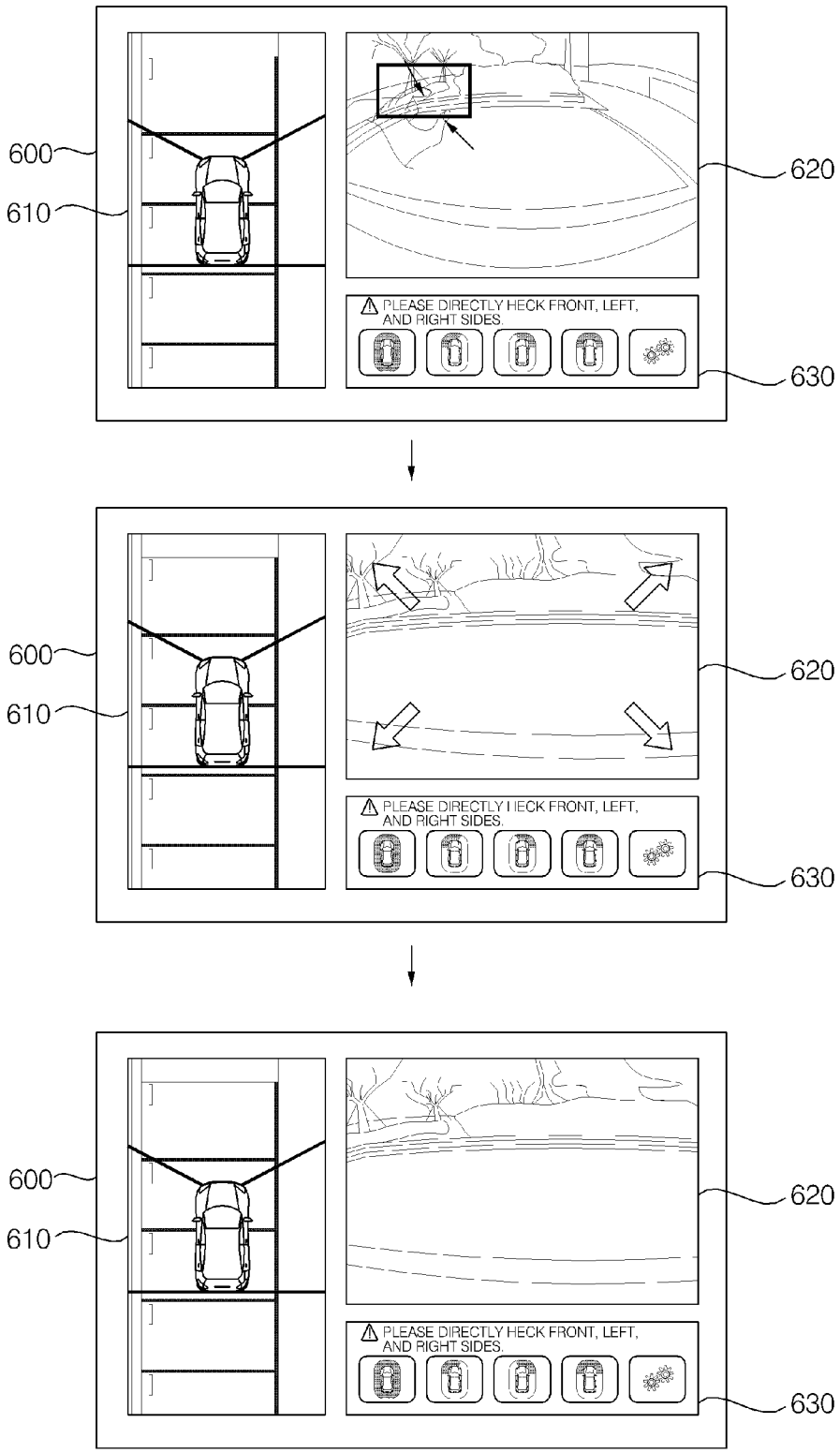
FIG. 5 is a diagram illustrating an operation state according to a third touch signal in the AVM system according to the present invention.

FIG. 5 is a diagram illustrating an operation state according to the third touch signal in the AVM system according to the present invention.

Referring to FIG. 5, a part of image data output on the around view area 610 may be enlarged and output according to a touch signal on the crop-view area 620, and an outputting screen may be controlled according to the third touch signal. More particularly, when a user touches and then pinches a part of the crop-view area 620 with two fingers, the touched crop-view area 620 may be zoomed in or zoomed out.

Figure 6:
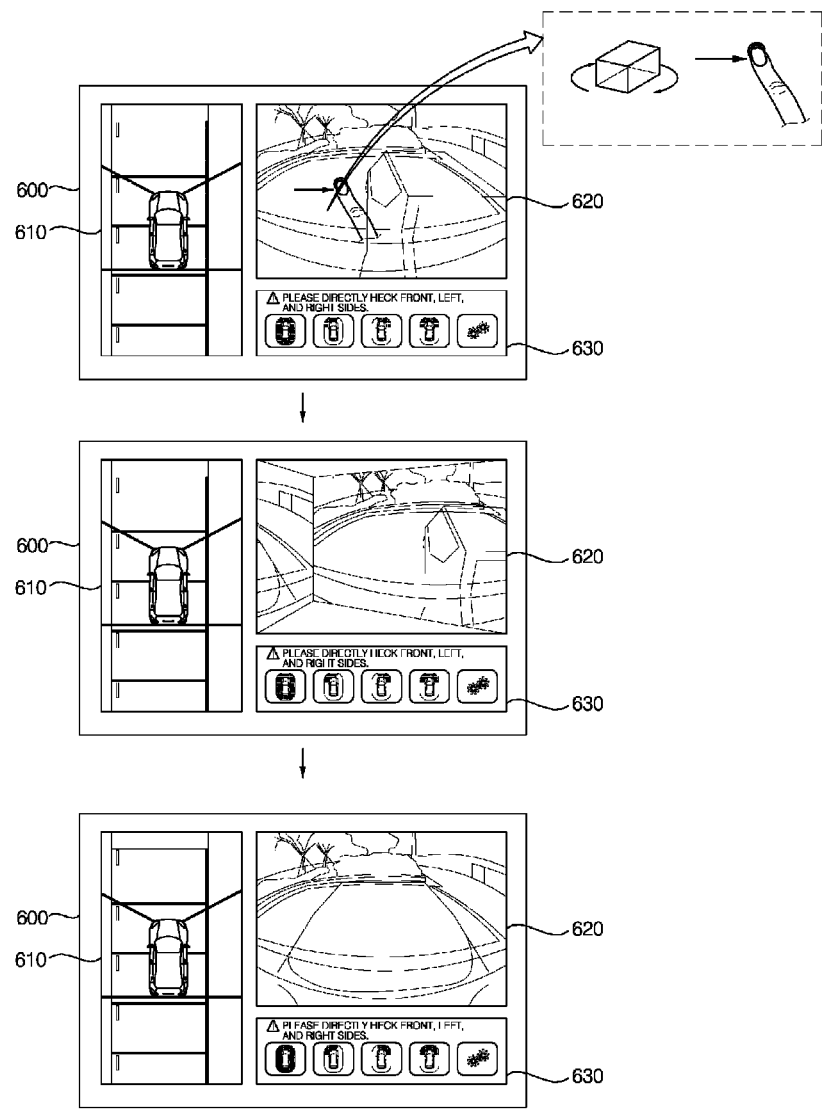
FIG. 6 is a diagram illustrating an operation state according to a fourth touch signal in the AVM system according to the present invention.

FIG. 6 is a diagram illustrating an operation state according to the fourth touch signal in the AVM system according to the present invention.

Referring to FIG. 6, a part of image data output on the around view area 610 may be enlarged and output according to a touch signal on the crop-view area 620, and an outputting screen may be controlled according to the fourth touch signal. More particularly, when a user touches a part of the crop-view area 620 one time, and then pushes the touched part in one direction among the up, down, left, and right directions, the crop-view area 620 may rotate in a rotation cube type to output image data.

An icon, which is capable of selecting an output angle of the image data output on the crop-view area 620, may be generated in the button area 630.

Hereinafter, a method of controlling the AVM system according to an exemplary embodiment of the present invention will be described.

First, a user activates the AVM system.

When the AVM system is activated, the travel information receiving unit 100 first receives gear information from the transmission 500 of the vehicle. The travel information receiving unit 100 check whether the vehicle drives or reverses, and when the gear information indicates that the vehicle drives, the travel information receiving unit 100 outputs image data of the front camera 400 of the vehicle, and when the gear information indicates that the vehicle reverses, the travel information receiving unit 100 outputs image data of the rear camera 400 of the vehicle.

When the travel information receiving unit 100 receives the gear information, and then the user inputs touch signal through the display device 600, the touch input receiving unit 200 receives a touch signal.

After the travel information receiving unit 100 receives the gear information and the touch signal, the view change effect selection unit 310 analyzes the received touch signal.

Here, the method of analyzing the touch signal will be described below.

First, the view change effect selection unit 310 determines whether the touch is operated with one or two fingers through position coordinate counting of the touch signal.

When the touch is operated with one finger, the view change effect selection unit 310 stores a time, at which the touch signal is input, and touch coordinates. When the corresponding touch signal is terminated within time t1 after the first touch signal is input, and the second touch signal is not input within time t2, the view change effect selection unit 310 recognizes the touch signal as the first touch signal, and transmits the touch coordinates and an output effect of the image data to the view change unit 320.

When the corresponding touch signal is terminated within time t1 after the first touch signal is input, and a second touch signal is input within time t2, the view change effect selection unit 310 recognizes the touch signal as the second touch signal, and transmits the touch coordinates and an output effect of the image data to the view change unit 320.

When the corresponding touch signal is maintained and the touch coordinates are changed within time t1 after the first touch signal is input, the view change effect selection unit 310 recognizes the touch signal as a fourth touch signal, and transmits the touch coordinates and an output effect of the image data to the view change unit 320.

When the touch is operated with two fingers, the view change effect selection unit 310 stores a time, at which the touch signal is input, and touch coordinates. When it is assumed that a distance between touch coordinates of the two fingers at time t2 is Lt1, and a distance between touch coordinates of the two fingers at time t3 is Lt2, when Lt2−Lt1 is larger than 0, the view change effect selection unit 310 recognizes the touch as a zoom-in operation, and when Lt2−Lt1 is smaller than 0, the view change effect selection unit 310 recognizes the touch as a zoom-out operation, and transmits the touch coordinates and an output effect of the image data to the view change unit 320.

When the view change effect selection unit 310 analyzes the received touch signal and transmits the output effect of the image data to the view change unit 320, the view change unit 320 applies the output effect to the image data and then outputs the image data on the display device 600.

According to the AVM system and the method of controlling the same according to the exemplary embodiment of the present invention including the aforementioned configuration, it is possible to display a customized image based on a touch input of a user, and intuitively display a correlation between views by applying various animation effects when a view is changed, thereby improving convenience for a user.

In the AVM system and the method of controlling the same according to the exemplary embodiment, the configuration and method of the exemplary embodiments as described above may not be limited, but the exemplary embodiments may be configured by selectively combining all or a part of each embodiment such that various modifications may be made.

While the exemplary embodiment of the present invention has been illustrated and described above, the present invention is not limited to the aforementioned specific exemplary embodiment, various modifications may be made by a person with ordinary skill in the art to which the present invention pertains without departing from the subject matters of the present invention that are claimed in the claims, and these modifications should not be appreciated individually from the technical spirit or prospect of the present invention.

What is claimed is:

1. An around view monitor system, comprising:
a display device including a screen divided into an around view area displaying a top view of an around view image of a vehicle, a crop-view area displaying an enlarged view of a part image of the around view image, and a button area displaying an icon for selecting an angle of the part image;
a touch sensor configured to generate and transmit a touch signal when one of the around view area, the crop-view area, and the button area is touched; and
a controller, including a processor, configured to control an output effect to be applied to image data around the vehicle output to the display device according to the touch signal transmitted from the touch sensor,
wherein the controller is further configured to display the enlarged view of the part image of the around view image on the crop-view area when the part image of the around view image is touched and selected on the around view area,
wherein the touch signal includes at least one of:
a first touch signal of touching the around view area of the display device one time;
a second touch signal of continuously touching the around view area of the display device two times within a preset time period;
a third touch signal of zooming in or zooming out the crop-view area of the display device; and
a fourth touch signal of touching the crop-view area of the display device to push and rotate the enlarged view of the part image in a direction, and
wherein the controller is further configured to move the around view image upwardly or downwardly on the around view area when the second touch signal sensed from the around view area is received,
wherein the around view area outputs the image data according to the second touch signal, and
wherein the crop-view area outputs the image data according to one of the first touch signal, the third touch signal, and the fourth touch signal.

2. The around view monitor system of claim 1, wherein the controller is further configured to:
select the output effect corresponding to the touch signal among a plurality of output effects; and
apply the selected output effect to the image data.

3. A method of controlling an around view monitor system, comprising:
receiving a touch signal when a screen of a display device is touched, the screen being divided into an around view area displaying a top view of an around view image of a vehicle, a crop-view area displaying an enlarged view of a part image of the around view image, and a button area displaying an icon for selecting an angle of the part image; and
displaying the enlarged view of the part image of the around view image on the crop-view area when the part image of the around view image is touched and selected on the around view area,
wherein the touch signal includes at least one of:
a first touch signal of touching the around view area of the display device one time;
a second touch signal of continuously touching the around view area of the display device two times within a preset time period;
a third touch signal of zooming in or zooming out the crop-view area of the display device; and
a fourth touch signal of touching the crop-view area of the display device to push and rotate the enlarged view of the part image in a direction, and
wherein the method further comprises moving the around view image upwardly or downwardly on the around view area when the second touch signal sensed from the around view area is received,
wherein the around view area outputs the image data according to the second touch signal, and
wherein the crop-view area outputs the image data according to one of the first touch signal, the third touch signal, and the fourth touch signal.

4. The around view monitor system of claim 1, wherein the controller is further configured to zoom in or out the part image of the around view image on the crop-view area when the third touch signal is received.

5. The around view monitor system of claim 1, wherein the controller is further configured to rotate the part image of the around view image in the direction on the crop-view area when the fourth touch signal is received.

6. The around view monitor system of claim 3, further comprising zooming in or out the part image of the around view image on the crop-view area when the third touch signal is received.

7. The around view monitor system of claim 3, further comprising rotating the part image of the around view image in the direction on the crop-view area when the fourth touch signal is received.

* * * * *